(12) United States Patent
Grosch et al.

(10) Patent No.: US 10,996,659 B2
(45) Date of Patent: May 4, 2021

(54) METHOD AND REDUNDANT AUTOMATION SYSTEM WITH A PLURALITY OF PROCESSOR UNITS PER HARDWARE UNIT

(71) Applicant: Siemens Aktiengesellschaft, Munich (DE)

(72) Inventors: Thomas Grosch, Roβtal (DE); Albert Renschler, Ettlingen (DE); Jürgen Laforsch, Bühl (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/682,322

(22) Filed: Nov. 13, 2019

(65) Prior Publication Data

US 2020/0150635 A1 May 14, 2020

(30) Foreign Application Priority Data

Nov. 14, 2018 (EP) ..................... 18206328

(51) Int. Cl.
*H04L 29/08* (2006.01)
*H04L 29/06* (2006.01)
(Continued)

(52) U.S. Cl.
CPC ..... *G05B 19/41835* (2013.01); *G06F 9/5044* (2013.01); *G06F 9/52* (2013.01); *G05B 2219/31229* (2013.01)

(58) Field of Classification Search
CPC .... G05B 19/41835; G05B 2219/31229; H04L 63/10; H04L 67/12; H04L 67/34; G06F 9/5044; G06F 9/52; G06F 9/5072
See application file for complete search history.

(56) References Cited

U.S. PATENT DOCUMENTS 9,952,932 B2 * 4/2018 Helleren ................ G06F 9/505
10,387,257 B1 * 8/2019 Brown ................ G06F 11/0793
(Continued)

FOREIGN PATENT DOCUMENTS

EP 2657797 10/2013
EP 2667269 11/2013
(Continued)

OTHER PUBLICATIONS

Ritika et al., DynaSAN: Multipathing integration, load balancing & failover over storage virtualization, 5 pages (Year: 2015).*
(Continued)

*Primary Examiner* — Thuy Dao
(74) *Attorney, Agent, or Firm* — Cozen O'Connor

(57) ABSTRACT

A plurality of hardware units of a redundant automation system each include a plurality of processor units that each execute a group of tasks, where groups of tasks executed on different hardware units receive the same input signals directly or indirectly from a managed industrial process, and determine the same output signals for the managed industrial process, where however, only the tasks of one of the groups executed on different hardware units each output their output signals to the managed industrial process, where the groups executed on different hardware units synchronize with one another via a respective communication link, and where the groups of tasks executed on the same hardware unit exchange data between themselves on a pair basis via a respective pair of intermediate storage units.

23 Claims, 3 Drawing Sheets

(51) Int. Cl.
*G06F 9/50* (2006.01)
*H04L 12/24* (2006.01)
*H04L 12/911* (2013.01)
*G05B 19/418* (2006.01)
*G06F 9/52* (2006.01)

(56) References Cited

U.S. PATENT DOCUMENTS

| | | | |
|---|---|---|---|
| 10,868,895 B2* | 12/2020 | Wouhaybi | G05B 19/054 |
| 2013/0290776 A1 | 10/2013 | Grosch et al. | |
| 2014/0082413 A1 | 3/2014 | Bilich | |
| 2018/0120796 A1 | 5/2018 | Tegnell et al. | |

FOREIGN PATENT DOCUMENTS

| | | |
|---|---|---|
| EP | 3002682 | 4/2016 |
| EP | 3316052 | 5/2018 |

OTHER PUBLICATIONS

EP Search Report dated Jun. 12, 2019 based on EP18206328.9 filed Nov. 14, 2018.

* cited by examiner

METHOD AND REDUNDANT AUTOMATION SYSTEM WITH A PLURALITY OF PROCESSOR UNITS PER HARDWARE UNIT

BACKGROUND OF THE INVENTION

1. Field of the Invention

The present invention relates to an operating method for a redundant automation system which comprises at least one first and one second hardware unit, where the first and the second hardware unit each comprise at least one first processor unit, the first processor unit of the first hardware unit executes a first group of tasks, the first processor unit of the second hardware unit executes a second group of tasks, the tasks of the first and second group receive directly or indirectly the same input signals from a managed industrial process and determine the same output signals for the managed industrial process, but only either the tasks of the first group or the tasks of the second group output their output signals to the managed industrial process, where in the event of a failure of the first hardware unit the tasks of the second group always output their output signals to the managed industrial process and in the event of a failure of the second hardware unit the tasks of the first group always output their output signals to the managed industrial process, and where the tasks of the first and of the second group synchronize with one another by means of a first communication link.

The present invention furthermore relates to a redundant automation system that comprises at least one first and one second hardware unit, where the first and the second hardware unit each comprise at least one first processor unit, the first hardware unit is configured to execute a first group of tasks via its first processor unit, the second hardware unit is configured to execute a second group of tasks via its first processor unit, the tasks of the first and of the second group receive directly or indirectly the same input signals from a managed industrial process and determine the same output signals for the managed industrial process and make these available to the managed industrial process, and where the redundant automation system comprises a first communication link via which the tasks of the first and of the second group synchronize with one another.

2. Description of the Related Art

EP 2 657 797 A1 and EP 2 667 269 A1 each disclose a conventional operating method and an associated automation system.

In automation systems, in many cases, high availability solutions (so called H systems) are required. A distinctive feature of H systems is that one and the same automation task is executed redundantly on a plurality of different hardware units, but only the output signals of one of the hardware units are actually used to manage the industrial process. In this way, it is possible in the event of failure of the hardware unit used to manage the industrial process for the other hardware unit to take over management of the process without any delay or at least practically without any delay.

In order to ensure that it is actually possible for the management of the industrial process to be taken over without any delay or at least practically without any delay, it is necessary, on the one hand, for the hardware units, which are each processing the automation task, to be synchronized. It must be ensured that the hardware units work with the same data and that the same data is processed in the same way. Following a failure and a subsequent repair or replacement of one of the hardware units, it must furthermore be possible to introduce the repaired or replaced hardware unit again into the hardware unit managing the process and to synchronize with said hardware unit. Solutions to this can be found in the two aforementioned EP publications.

The solutions shown in the two EP publications are intended for hardware units that each have only one single processor unit. Hardware units that have a plurality of processors or a plurality of processor cores, i.e., at least a first and a second processor unit are, however, increasingly being used also in automation technology. The use of a plurality of processor units is, however, only possible to a limited extent if the synchronization of the processor units is necessary from one hardware unit to the other hardware unit. In particular, the performance benefit offered by multicore processors cannot be used or can only partially be used. Furthermore, using the procedures as mentioned in the aforementioned EP publications also results in the problem that the different tasks of the system have to be equipped with interruption points in the same way. This is then particularly difficult if program parts that come from software libraries are used and, therefore, cannot be changed or at least should not be changed.

In the prior art, the task for which the time interval of the interruption points is the greatest determines the response capacity of the system and, therefore, in particular also the responsive capacity of the process management. In the prior art, this problem can only be solved by laboriously equipping all of the software components with a plurality of interruption points. However, this results in longer response times.

It is possible to distribute the different tasks, which make up the automation task, across the different processor units (processors or processor cores) of the hardware units. This, however, only results directly and immediately in a reasonable solution if either the tasks work with local data only or in cases where they work with global data no data exchange is required between the tasks which are executed via one of the processor units and the tasks which are executed via one of the other processor units. In this case, i.e., where the first and the second hardware unit also each comprise a second processor unit in addition to the respective first processor unit, it is possible to further develop the conventional procedures such that the second processor unit of the first hardware unit executes a third group of tasks, the second processor unit of the first hardware unit executes a fourth group of tasks, the tasks of the third and of the fourth group receive directly or indirectly the same input signals from the managed industrial process and determine the same output signals for the managed industrial process, but only either the tasks of the third group or the tasks of the fourth group output their output signals to the managed industrial process, in the event of a failure of the first hardware unit the tasks of the fourth group furthermore also always output their output signals to the managed industrial process and in the event of a failure of the second hardware unit the tasks of the third group furthermore always also output their output signals to the managed industrial process, and such that the tasks of the third and of the fourth group synchronize with one another via a second communication link.

In this case, the conventional procedures described in the EP publications are therefore executed separately between corresponding groups of tasks. As already mentioned, however, in this case none of the data used by the first processor unit of the respective hardware unit may also be used by the second processor units of the respective hardware unit. In particular, an access of this nature would result in the loss of path synchronicity.

SUMMARY OF THE INVENTION

In view of the foregoing, it is therefore an object of the present invention to provide opportunities for distributing, in a simple manner, tasks of an automation task across processor units of hardware units also in the case of hardware units with a plurality of processor units.

This and other objects and advantages are achieved in accordance with the invention by an operating method in which, for cases where the first and the second hardware unit each also at least include a second processor unit, the operating method is performed such that the second processor unit of the first hardware unit executes a third group of tasks; the second processor unit of the second hardware unit executes a fourth group of tasks; the tasks of the third and fourth group directly or indirectly receive the same input signals from the managed industrial process and determine the same output signals for the managed industrial process, but only either the tasks of the third group or the tasks of the fourth group output their output signals to the managed industrial process; in the event of a failure of the first hardware unit the tasks of the fourth group furthermore always also output their output signals to the managed industrial process and in the event of a failure of the second hardware unit the tasks of the third group furthermore always also output their output signals to the managed industrial process, the tasks of the third and fourth group synchronize with one another via a second communication link, the tasks of the first group store data in a first intermediate storage unit of the first hardware unit and the tasks of the third group read out the data stored in the first intermediate storage unit of the first hardware unit from the first intermediate storage unit of the first hardware unit, the tasks of the third group store data in a second intermediate storage unit of the first hardware unit and the tasks of the first group read out the data stored in the second intermediate storage unit of the first hardware unit from the second intermediate storage unit of the first hardware unit, the tasks of the second group store data in a first intermediate storage unit of the second hardware unit and the tasks of the fourth group read out the data stored in the first intermediate storage unit of the second hardware unit from the first intermediate storage unit of the second hardware unit, and the tasks of the fourth group store data in a second intermediate storage unit of the second hardware unit and the tasks of the second group read out the data stored in the second intermediate storage unit of the second hardware unit from the second intermediate storage unit of the second hardware unit, It is therefore possible, on the one hand, via the communication links to synchronize the groups of tasks running on the one hardware unit with the groups of tasks running on the other hardware unit. On the other hand, the intermediate storage units ensure that the tasks executed respectively by one of the processor units of one of the hardware units work, on the one hand, with local data yet can still exchange information with those tasks that are executed by the other processor units of the respective hardware unit.

In a preferred embodiment, the intermediate storage units of the hardware units are configured as First-In First-Out (FIFO) storage units. These types of intermediate storage units particularly ensure that the data written longest ago is read out again first. Other intermediate storage units are possible, in particular intermediate storage units with which a prioritization of elements is possible. It must, however, be ensured in all embodiments that the respective intermediate storage unit does not become full and overflow.

In a further preferred embodiment, the tasks of the first to fourth group wait for the save to occur if the data to be read out by the tasks has not yet been saved in the respective intermediate storage unit of the respective hardware unit. In this way, the path synchronicity between the groups of tasks that are executed by the processor units of the same hardware unit can be ensured in a simple manner.

In the event that neither the first nor the second hardware unit fails, it is possible for the definition as to which tasks output their output signals to the managed industrial process to be statically maintained. This embodiment is particularly simple to realize.

In this case, either the tasks of the first and of the fourth group or the tasks of the second and of the third group preferably output their output signals to the managed industrial process. As a result, the communication links between the hardware units can be used particularly efficiently despite the static definition as to which tasks output their output signals to the managed industrial process.

Alternatively, it is possible to capture the extent to which data from the first hardware unit is transmitted to the second hardware unit and the extent to which data from the second hardware unit is transmitted to the first hardware unit. In this case, taking into consideration the captured parameters it is possible to determine dynamically which of the tasks output their output signals to the managed industrial process.

The first communication link and the second communication link can in particular be formed as separate streams or as one single stream. It is also possible for the first communication link and the second communication link to be physically different communication links. However, it is usually just a logical distinction between the two communication links.

It is also an object of the invention to provide a redundant automation system in which, for cases where the first and the second hardware unit each also at least include a second processor unit, the automation system is configured such that the first hardware unit is configured to execute a third group of tasks via its second processor unit; the second hardware unit is configured to execute a fourth group of tasks via its second processor unit; the tasks of the third and fourth group receive directly or indirectly the same input signals from the managed industrial process and determine the same output signals for the managed industrial process and make these available to the managed industrial process, the redundant automation system also comprises a second communication link via which the tasks of the third and fourth group synchronize with one another; the first hardware unit has a first intermediate storage unit in which the tasks of the first group save data and from which the tasks of the third group read out the data saved at this location, the first hardware unit has a second intermediate storage unit in which the tasks of the third group save data and from which the tasks of the first group read out the data saved at this location, the second hardware unit has a first intermediate storage unit in which the tasks of the second group save data and from which the tasks of the fourth group read out the data saved at this location, and the second hardware unit has a second intermediate storage unit in which the tasks of the fourth group save data and from which the tasks of the second group read out the data saved at this location.

The effects and advantages achieved in this way correspond to those of the operating method. The advantageous embodiments of the automation system also correspond to those of the operating method. The advantages which can be achieved in this way are also the same.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The afore-described properties, features and advantages of this invention as well as the manner in which they are achieved will become clearer and more comprehensible in conjunction with the following description of the exemplary embodiments, which are explained in more detail in conjunction with the drawings, in which, in schematic diagrams.

DETAILED DESCRIPTION OF THE EXEMPLARY EMBODIMENTS

Figure 1:
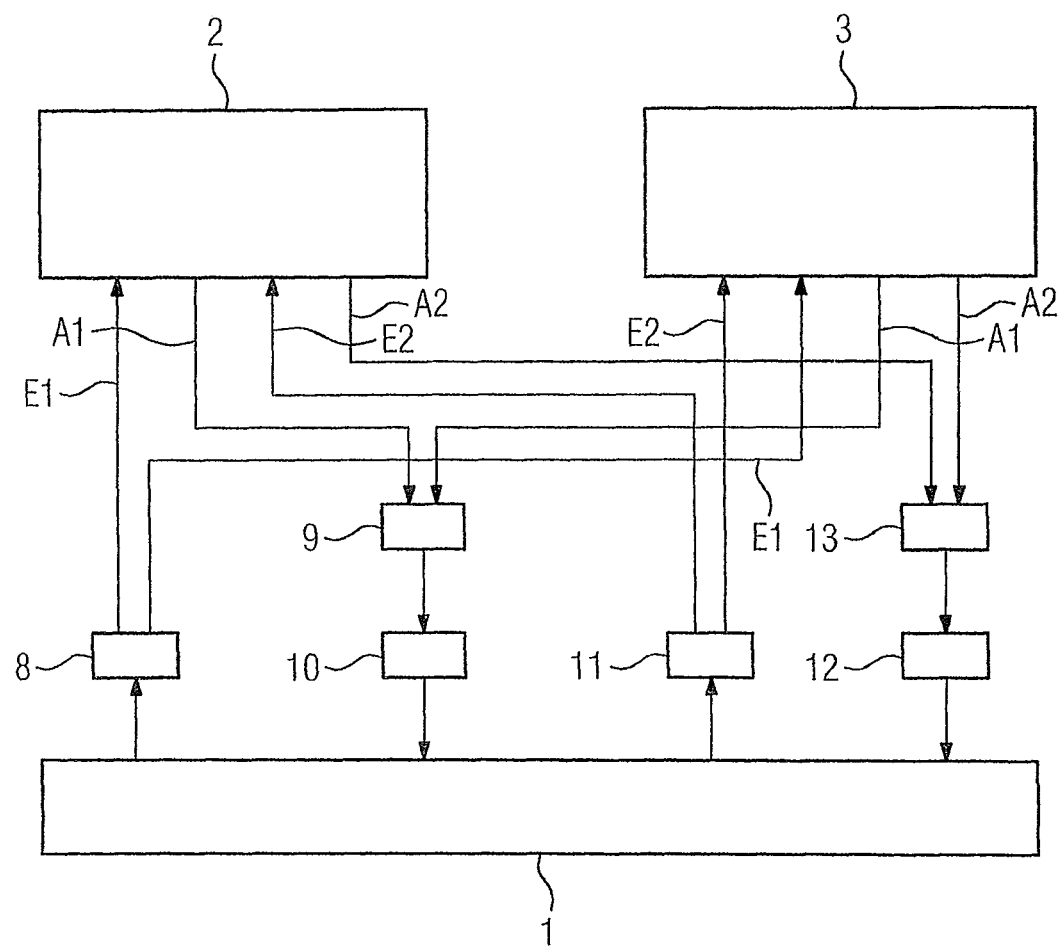
FIG. 1 shows a schematic diagram of a process and a plurality of components managing the process in accordance with the invention.

With reference to FIG. 1, an industrial technical process 1 is to be managed via an automation system. The industrial technical process 1 can in principle be of any nature. For example, the technical process 1 can be a process for distributing letters in a distribution system for letters.

The automation system is formed as a redundant automation system. In particular, the automation system comprises at least one first hardware unit 2 and one second hardware unit 3. Where appropriate, additional hardware units not shown in the figures can also be present. The hardware units 2, 3 are independent and are in a position to manage the process 1 independently of the respective other hardware unit 3, 2. The purpose and objective of this redundancy is for it to be possible for the process 1 to be operated further under the management of the other hardware units 3, 2 without interruption, even in the event of the failure of one of the hardware units 2, 3.

Figure 2:
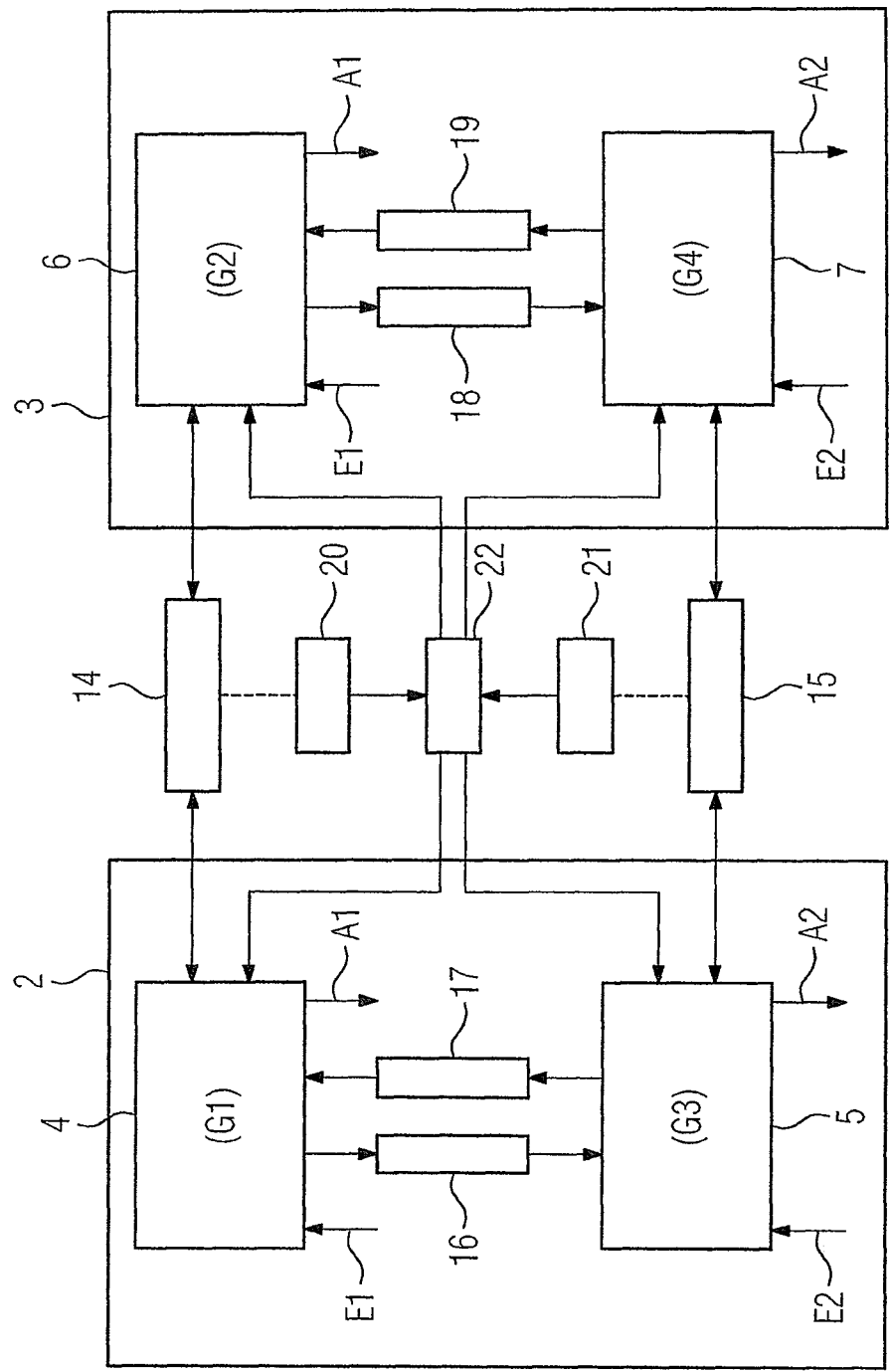
FIG. 2 shows a schematic diagram of the internal structure of a redundant automation system in accordance with the invention.

In accordance with FIG. 2, the first hardware unit 2 comprises at least one first processor unit 4 and one second processor unit 5. Where appropriate the first hardware unit 2 can also comprise additional processor units not shown in the figures. Similarly the second hardware unit 3 also comprises at least one first processor unit 6 and one second processor unit 7. Where appropriate, the second hardware unit 3 can also comprise further processor units not shown in the figures.

The first processor unit 4 of the first hardware unit 2 executes a first group G1 of tasks. Similarly, the first processor unit 6 of the second hardware unit 3 executes a second group G2 of tasks. Similarly, the second processor unit 5 of the first hardware unit 2 executes a third group G3 of tasks. Similarly, the second processor unit 7 of the second hardware unit 3 executes a fourth group G4 of tasks.

The different groups G1 to G4 of tasks correspond to one another in pairs. In particular, the tasks of the first and second groups G1, G2 receive the same input signals E1 from the process 1 via sensors 8 (see FIG. 1). For example, corresponding sensors 8 can be present that capture the associated sensor signals of the process 1 and output the input signals E1. Here, it is possible for the input signals E1 to be transmitted directly from the sensors 8 to the corresponding groups G1, G2. In this context, "directly" means that the transfer to the corresponding processor unit 4, 6 occurs from the corresponding sensors 8, but without interconnecting one of the other processor units 4, 5, 6, 7. Alternatively, it is possible for the input signals E1 to be transmitted indirectly from the sensors 8 to the corresponding groups G1, G2. In this context, "indirectly" means that the transfer to the corresponding processor unit 4, 6 occurs from the corresponding sensors 8 with the interconnection of one of the other processor units 4, 5, 6, 7.

Furthermore, the tasks of the first and second group G1, G2 determine the same output signals A1 for the process 1 and make available the output signals A1 determined by each of them for the process 1. However, only either the tasks of the first group G1 or the tasks of the second group G2 output their output signals A1 to the process 1. For example, the tasks of the first and second group G1, G2 can indeed both transmit the output signals A1 to a switchover device 9 (see FIG. 1), the switchover device 9, however, forwards only the output signals A1 of the tasks of one of the two groups G1, G2 to actuators 10, and hence to the process 1.

In this way, only one of the two groups G1, G2 is therefore active in the sense that its output signals A1 actually influence the process 1. This group (for example, group G1) receives the input signals E1 directly. The other group (for example, group G2) can either receive the input signals E1 directly from the sensors 8 or indirectly via the other group, in the case of this example therefore group G1.

The tasks of the third and fourth group G3, G4 interact in exactly the same way. In particular, the tasks of the third and fourth group G3, G4 also receive the same input signals E2 directly or indirectly from the sensors 11 from the process 1, determine the same output signals A2 for the process 1 and make available the output signals A2 for the process 1. However, only either the tasks of the third group G3 or the tasks of the fourth group G4 output their output signals A2 to actuators 12, and hence to the process 1. As before, here too a corresponding switchover device 13 can be present for this purpose.

The actuators 12 are different actuators from the actuators 10. The switchover device 13 is also a different switchover device from the switchover device 9. Similarly, the sensors 11 can also be different sensors from the sensors 8. They can also, however, be (completely or partially) the same sensors.

As a result of the evaluation of the input signals E1, E2 by both hardware units 2, 3 and the determination of the output signals A1, A2 by both hardware units 2, 3, it is possible, in the event of a failure of one of the two hardware units 2, 3, that the groups G1 to G4 of tasks executed by the processor units 4 to 7 of the respective other hardware unit 3, 2 continue to output their output signals A1, A2 to the process 1. In the event of a failure of the first hardware unit 2 these are the tasks of the second and of the fourth group G2, G4, in the event of a failure of the second hardware unit 3 the tasks of the first and of the third group G1, G3.

In order to ensure a correct management of the process 1, the groups G1, G2, G3, G4 of tasks executed by the hardware units 2, 3 must be synchronized with one another. This is particularly necessary in order to effect a correct switching of the active groups G1, G2, G3, G4 in the event of a failure of one of the two hardware units 2, 3.

The automation system comprises a first communication link 14 to ensure the requisite synchronization. The tasks of the first and of the second group G1, G2 synchronize with one another via the first communication link 14. Furthermore, the automation system comprises a second communication link 15. The tasks of the third and fourth group G3, G4 synchronize with one another via the second communication link 15. The synchronization, in relation to the respective communication link 14, 15, can, for example, be performed in the same manner as described in detail in EP 2 657 797 A1 and in EP 2 667 269 A1.

The first communication link 14 and the second communication link 15 can each have one stream per communication direction. Alternatively, it is possible for just one single stream to be present per communication link 14, 15 or per communication direction so that this results in only two streams. It is even possible to merge the two communication links 14, 15 for both communication directions into a single stream.

Furthermore the groups G1, G2, G3, G4 of tasks processed on the same hardware unit 2, 3 exchange data between each other. This will now be described in greater detail with reference to the first hardware unit 2.

In order to exchange the data, the tasks of the first group G1 save the data which is to be transmitted to the tasks of the third group G3 in a first intermediate storage unit 16. The tasks of the third group G3 read out the data saved in the first intermediate storage unit 16 from the first intermediate storage unit 16. Similarly, the tasks of the third group G3 save the data that is to be transmitted to the tasks of the first group G1 in a second intermediate storage unit 17. The tasks of the first group G1 read out the data saved in the second intermediate storage unit 17 from the second intermediate storage unit 17. The intermediate storage units 16, 17 therefore each serve as the unidirectional transmission of data from the tasks of the first group G1 to the tasks of the third group G3. Therefore, exclusively data from the tasks of the first group G1 is written to the first intermediate storage unit 16 and exclusively data from the tasks of the third group G3 is read out from the first intermediate storage unit 16. Conversely, exclusively data from the tasks of the third group G3 is written to the second intermediate storage unit 17 and exclusively data from the tasks of the first group G1 is read out from the second intermediate storage unit 17. The intermediate storage units 16, 17 can be designed, for example, as First-In First-Out (FIFO) storage units.

It can happen in individual cases that the tasks of the third or first group G3, G1 want to read out data from the respective intermediate storage unit 16, 17 when the data has not yet been stored by the tasks of the first or third group G1, G3 in the respective intermediate storage unit 16, 17. Here, the tasks of the affected group G3, G1 wait for the corresponding data to be stored in the corresponding intermediate storage unit 16, 17.

Exactly the same embodiments apply to the second hardware unit 3. The requisite intermediate storage units are provided in FIG. 2 with the reference characters 18 and 19.

The mode of operation of one of the active groups G1, G2, G3, G4 of tasks is explained in more detail below in conjunction with FIG. 3, the mode of operation of one of the non-active groups G1, G2, G3, G4 in conjunction with FIG. 4. In this case, it is assumed below that of the two groups G1 and G2 the group G1 is the active group and the group G2 is the non-active group.

Figure 3:
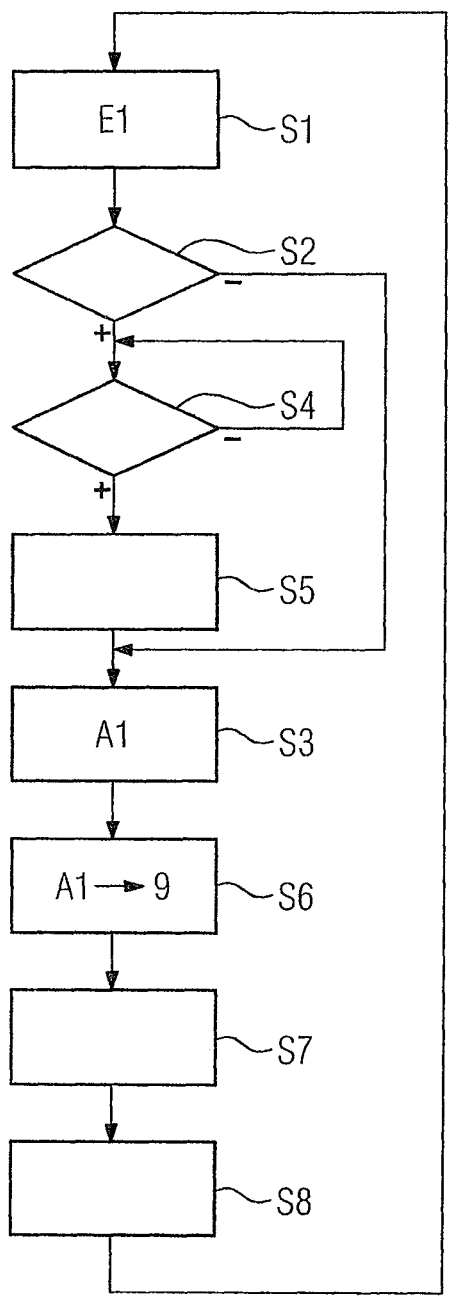
FIGS. 3 and 4 are flowcharts of the method in accordance with the invention.

With reference to FIG. 3, the active group G1 receives its input signals E1 (indeed directly from the sensors 8) in a step S1. In a step S2, the active group G1 checks whether it needs data from the third group G3. If this is not the case, then the active group G1 moves directly to a step S3. However, if the active group G1 needs data from the third group G3, then the active group G1 checks in a step S4 whether the required data is stored in the second intermediate storage unit 17. If this is not the case, then the step S4 is repeated until the data is stored. Otherwise, the active group G1 reads out the corresponding data in a step S5 from the second intermediate storage unit 17 and then moves onto the step S3. In the step S3, the active group G1 determines the output signals A1 for the process 1. It considers, where required, the input signals E1 and the data transmitted from the third group G3. The active group G1 makes available the determined output signals A1 for the process 1 in a step S6. In particular, in the step S6, a transmission to the switchover device 9 is possible. In a step S7, the active group G1 writes the data, which is to be transmitted to the third group G3, into the first intermediate storage unit 16. In a step S8, the active group G1 executes those tasks that are required on its side as part of the synchronization with the non-active group G2. The step S8 actions can, in particular, also include the transmission of the input signals E1 to the non-active group G2. Further details on the procedure can be found in the aforementioned EP 2 657 797 A1. Once step S8 has been completed the active group G1 returns again to the step S1.

Figure 4:
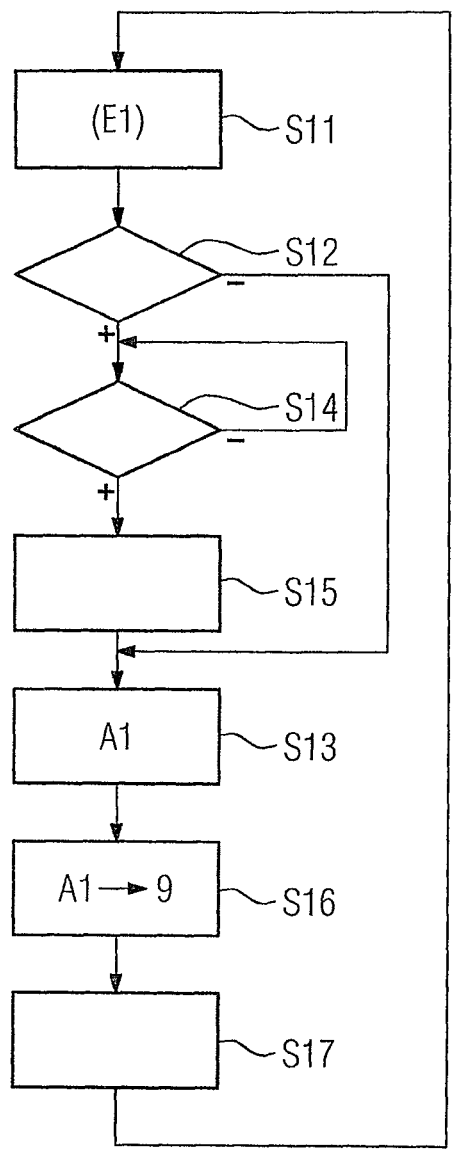

With reference to FIG. 4, the non-active group G2 executes in a step S11 those tasks that are required on its side as part of the synchronization with the active group G1. The step S11 actions can particularly include the receipt of the input signals E1 by the active group G1. In addition, where required, an acknowledgment can also be reported back to the active group G1. Here, further details on the procedure can also be found in the aforementioned EP 2 657 797 A1. In a step S12, the non-active group G2 checks whether it needs data from the fourth group G4. If this is not the case, then the non-active group G2 moves directly to a step S13. However, if the non-active group G1 needs data from the fourth group G4, then the non-active group G2 checks in a step S14 whether the required data is stored in the second intermediate storage unit 19 of the second hardware unit 3. If this is not the case, the step S14 is repeated until the data is stored. Otherwise the non-active group G2 reads out the corresponding data in a step S15 from the second intermediate storage unit 19 of the second hardware unit 3 and then moves onto step S13. In the step S13, the non-active group G2 determines the output signals A1 for the process 1. The non-active Group G2 considers, where required, the input signals E1 and the data transmitted from the fourth group G4. The non-active group G2 makes available the determined output signals A1 for the process 1 in a step S16. In particular, a transmission to the switchover device 9 is possible. In a step S17, the non-active group G2 writes the data, which is to be transmitted to the fourth group G4, into the first intermediate storage unit 18 of the second hardware unit 3.

Analogous embodiments also apply to the active and the non-active group of the two groups G3 and G4.

The two hardware units 2, 3 usually operate correctly. In this case, in which neither the first nor the second hardware unit 2, 3 fails, it is possible for the definition as to which tasks output their output signals A1, A2 to the managed industrial process 1 to be statically maintained. For example, it is possible to define, in the first instance, the groups G1 and G3 of tasks as active groups, and to retain this definition until the first hardware unit 2 fails. The groups G2 and G4 of tasks then assume the role of active groups of tasks. When the first hardware unit 2 is functioning again at a later stage, the groups G1, G3 of tasks executed by this unit are non-active groups. This status is again statically maintained until the second hardware unit 3 fails.

This embodiment is indeed possible, but from a communications loading perspective as regards the communication links 14, 15 it is suboptimal. This is, in particular, due to the fact that the scope of data which must be transmitted from the active groups of tasks to the non-active groups of tasks is considerably greater than the scope of data that must be transmitted back from the non-active groups of tasks to the active groups of tasks. It is therefore better to distribute the active groups of tasks across the two hardware units 2, 3. Therefore, if neither the first nor the second hardware unit 2, 3 fails, then preferably either the tasks of the first and of the fourth group G1, G4 or the tasks of the second and third group G2, G3 output their output signals A1, A2 to the process 1.

Better still is if the extent to which data from the first hardware unit 2 is transmitted to the second hardware unit 3 and the extent to which data from the second hardware unit 3 is transmitted to the first hardware unit 2 is captured according to the representation in FIG. 2 via capturing devices 20, 21. Here, the determined parameters can be transmitted from the capturing devices 20, 21 to a definition device 22. Here, the definition device 22 determines dynamically which of the tasks output their output signals A1, A2 to the process 1. Where required, the definition device 22 can manage the switchover devices 9, 13 accordingly to this end. It should be understood the definition device 22 takes into consideration as part of this determination, on the one hand, whether the hardware units 2, 3 are operating correctly. If one of the hardware units 2, 3 is not operating correctly, then it cannot be taken into consideration in the assignment of the active groups of tasks. Where the hardware units 2, 3 are operating correctly, the definition device 22 does, however, take the determined parameters into consideration in the aforementioned determination. The definition device 22 distributes the active groups G1, G2, G3, G4 across the hardware units 2, 3 such that the available bandwidth of all communication links 14, 15 is optimally utilized.

In this way, for each pair of groups G1, G2, G3, G4, for example, the two groups G1 and G2, it can be individually and uniquely determined which group G1, G2, G3, G4 of the respective pair is the active group and consequently which is the non-active group.

The present invention was explained above in conjunction with two hardware units 2, 3 and in conjunction with two processor units 4, 5, 6, 7 per hardware unit 2, 3. The procedure can, however, also be extended without difficulty to more than two hardware units 2, 3 and/or more than two processor units 4, 5, 6, 7 per hardware unit 2, 3. In particular, in the case of more than two processor units 4, 5, 6, 7 per hardware unit 2, 3, two intermediate storage units 16 to 19 must each be set up between each pair of processor units 4, 5, 6, 7 of the respective hardware unit 2, 3 for data exchange within the respective hardware unit 2, 3. Furthermore, in this case, the number of communication links 14, 15 must also be increased accordingly. In the case of more than two hardware units 2, 3, the communication links 14, 15 must be set up between all pairs of hardware units 2, 3.

In summary, the present invention thus relates to the following situation in which a plurality of hardware units 2, 3 of a redundant automation system each include a plurality of processor units 4, 5, 6, 7. The processor units 4, 5, 6, 7 each execute a group G1, G2, G3, G4 of tasks. Groups G1, G2, G3, G4 of tasks executed on various hardware units 2, 3 receive the same input signals E1, E2 directly or indirectly from a managed industrial process 1, and determine the same output signals A1, A2 for the managed industrial process 1. However, in each case, only the tasks of one of the groups G1 to G4 executed on different hardware units 2, 3 output their output signals A1, A2 to the managed industrial process 1. The groups G1, G2, G3, G4 executed on different hardware units 2, 3 synchronize with one another via a respective communication link 14, 15. The groups G1, G2, G3, G4 of tasks executed on the same hardware unit 2, 3 exchange data between themselves on a pair basis via a respective pair of intermediate storage units 16 to 19.

The present invention has many advantages. In particular, it is possible to use the conventional, advantageous procedures of EP 2 657 797 A1 and EP 2 667 269 A1 also in the case of hardware units 2, 3 each with a plurality of processor units 4 to 7. Furthermore, it is possible to distribute the active groups G1, G2, G3, G4 of tasks individually across the individual processor units 4 to 7. As a result, the error behavior improves, in particular. For example, individual errors lead only to a stop of the respective group G1, G2, G3, G4 of tasks, but not to a stop of all of the tasks executed by the respective hardware unit 2, 3. With corresponding assignment of tasks to the groups G1, G2, G3, G4 the process control and the communication can furthermore, for example, be outwardly decoupled. The pairs of groups G1, G2, G3, G4 of tasks can be parameterized independently of one another. This particularly relates to the interruption locations explained in EP 2 657 797 A1. In this way, different dynamic requirements can easily be taken into consideration. The transmission capacity of the communication links 14, 15 can be optimally utilized. The reintegration after a failure of a hardware unit 2, 3 has been resolved is simplified.

Although the invention has been illustrated and described in detail with the preferred exemplary embodiment, the invention is not restricted by the examples given, and a person skilled in the art can derive other variations therefrom without departing from the protective scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operating method for a redundant automation system comprising at least one first and one second hardware unit, the first and the second hardware units each comprising at least one first and one second processor unit; the method comprising:

executing by the first processor unit of the first hardware unit a first group of tasks;

executing by the first processor unit of the second hardware unit a second group of tasks;

executing by the second processor unit of the first hardware unit a third group of tasks;

executing by the second processor unit of the second hardware unit a fourth group of tasks;

receiving directly or indirectly the same input signals from a managed industrial process by tasks of the first and second groups and determining the same output signals for the managed industrial process, only one of (i) the tasks of the first group and (ii) the tasks of the second group outputting respective output signals to the managed industrial process;

receiving directly or indirectly the same input signals from the managed industrial process by the tasks of the third and fourth groups and determine the same output signals for the managed industrial process, only one of (i) the tasks of the third group and (ii) the tasks of the fourth group outputting respective output signals to the managed industrial process, and in an event of a failure of the first hardware unit the tasks of the second group and fourth groups always outputting respective output signals to the managed industrial process and in an event of a failure of the second hardware unit the tasks of the first group and third groups always outputting respective output signals to the managed industrial process;

synchronizing the tasks of the first and second groups with one another via a first communication link and synchronizing the tasks of the third and fourth groups with one another via a second communication link;

storing, by the tasks of the first group, data in a first intermediate storage unit of the first hardware unit and reading out, by the tasks of the third group, the data stored in the first intermediate storage unit of the first hardware unit from the first intermediate storage unit of the first hardware unit;

storing, by the tasks of the third group, data in a second intermediate storage unit of the first hardware unit and reading out, by the tasks of the first group, the data stored in the second intermediate storage unit of the first hardware unit from the second intermediate storage unit of the first hardware unit;

storing, by the tasks of the second group, data in a first intermediate storage unit of the second hardware unit and reading out, by the tasks of the fourth group, the data stored in the first intermediate storage unit of the second hardware unit from the first intermediate storage unit of the second hardware unit; and storing, by the tasks of the fourth group, data in a second intermediate storage unit of the second hardware unit and reading out, by the tasks of the second group, the data stored in the second intermediate storage unit of the second hardware unit from the second intermediate storage unit of the second hardware unit.

2. The operating method as claimed in claim 1, wherein all intermediate storage units of the first and second hardware units are configured as first-in-first-out (FIFO) storage units.

3. The operating method as claimed in claim 2, wherein the tasks of the first, second, third and fourth groups wait for a save to occurs if the data to be read out by said tasks has not yet been saved in a respective intermediate storage unit of a respective hardware unit.

4. The operating method as claimed in claim 3, wherein if neither the first nor the second hardware unit fails, one of (i) the tasks of the first and fourth groups and (ii) the tasks of the second and third groups output respective output signals to the managed industrial process.

5. The operating method as claimed in claim 2, wherein in an event that neither the first nor the second hardware units fails, a definition as to which tasks output respective output signals to the managed industrial process is statically maintainable.

6. The operating method as claimed in claim 2, wherein an extent to which data is transmitted from the first hardware unit to the second hardware unit and an extent to which data is transmitted from the second hardware unit to the first hardware unit is captured, and taking into consideration captured parameters which of the tasks output respective output signals to the managed industrial process is determined dynamically.

7. The operating method as claimed in claim 1, wherein the tasks of the first, second, third and fourth groups wait for a save to occurs if the data to be read out by said tasks has not yet been saved in a respective intermediate storage unit of a respective hardware unit.

8. The operating method as claimed in claim 7, wherein in an event that neither the first nor the second hardware units fails, a definition as to which tasks output respective output signals to the managed industrial process is statically maintainable.

9. The operating method as claimed in claim 7, wherein an extent to which data is transmitted from the first hardware unit to the second hardware unit and an extent to which data is transmitted from the second hardware unit to the first hardware unit is captured, and taking into consideration captured parameters which of the tasks output respective output signals to the managed industrial process is determined dynamically.

10. The operating method as claimed in claim 1, wherein in an event that neither the first nor the second hardware units fails, a definition as to which tasks output respective output signals to the managed industrial process is statically maintainable.

11. The operating method as claimed in claim 1, wherein an extent to which data is transmitted from the first hardware unit to the second hardware unit and an extent to which data is transmitted from the second hardware unit to the first hardware unit is captured, and taking into consideration captured parameters which of the tasks output respective output signals to the managed industrial process is determined dynamically.

12. The operating method as claimed in claim 1, wherein the first communication link and the second communication link are formed as separate streams or as one single stream.

13. A redundant automation system, comprising:

at least one first hardware unit configured to execute a first group of tasks via its first processor unit and a third group of tasks via its second processor unit; and at least one second hardware unit configured to execute a second group of tasks via its first processor unit and a fourth group of tasks via its second processor unit, the first and second hardware units each comprising at least one first and one second processor unit, the tasks of the first and second groups receiving directly or indirectly the same input signals from a managed industrial process and determining the same output signals for the managed industrial process and make these input and output signals available to the managed industrial process, and the tasks of the third and fourth groups receiving directly or indirectly the same input signals from the managed industrial process and determining the same output signals for the managed industrial process and make these input and output signals available to the managed industrial process;

a first communication link via which the tasks of the first and second groups synchronize with one another; and a second communication link via which the tasks of the third and fourth groups synchronize with one another;

wherein the first hardware unit includes a first intermediate storage unit in which the tasks of the first group save data and from which the tasks of the third group read out the data saved in the storage unit;

wherein the first hardware unit includes a second intermediate storage unit in which the tasks of the third group save data and from which the tasks of the first group read out the data saved in the second intermediate storage unit;

wherein the second hardware unit includes a first intermediate storage unit in which the tasks of the second group save data and from which the tasks of the fourth group read out the data saved the first intermediate storage unit; and wherein the second hardware unit has a second intermediate storage unit in which the tasks of the fourth group save data and from which the tasks of the second group read out the data saved in the second intermediate storage unit.

14. The redundant automation system as claimed in claim 13, wherein all intermediate storage units of the first and second hardware units are configured as first-in-first-out (FIFO) storage units.

15. The redundant automation system as claimed in claim 14, wherein the tasks of the first, second, third and fourth groups wait for the save to occurs if the data to be read out by said tasks has not yet been saved in a respective intermediate storage unit of a respective hardware unit.

16. The redundant automation system as claimed in claim 14, further comprising:

capturing devices from which an extent to which data is transmitted from the first hardware unit to the second hardware unit and the extent to which data is transmitted from the second hardware unit to the first hardware unit is captured; and a definition device which is supplied with the captured parameters and which, taking into consideration the captured parameters, determines dynamically which of the tasks output respective output signals to the managed industrial process.

17. The redundant automation system as claimed in claim 16, wherein the tasks of the first, second, third and fourth groups wait for the save to occurs if the data to be read out by said tasks has not yet been saved in a respective intermediate storage unit of a respective hardware unit.

18. The redundant automation system as claimed in claim 17, further comprising:

capturing devices from which an extent to which data is transmitted from the first hardware unit to the second hardware unit and the extent to which data is transmitted from the second hardware unit to the first hardware unit is captured; and a definition device which is supplied with the captured parameters and which, taking into consideration the captured parameters, determines dynamically which of the tasks output respective output signals to the managed industrial process.

19. The redundant automation system as claimed in claim 17, wherein the first communication link and the second communication link are formed as separate streams or as one single stream.

20. The redundant automation system as claimed in claim 14, wherein the first communication link and the second communication link are formed as separate streams or as one single stream.

21. The redundant automation system as claimed in claim 13, further comprising:

capturing devices from which an extent to which data is transmitted from the first hardware unit to the second hardware unit and the extent to which data is transmitted from the second hardware unit to the first hardware unit is captured; and a definition device which is supplied with the captured parameters and which, taking into consideration the captured parameters, determines dynamically which of the tasks output respective output signals to the managed industrial process.

22. The redundant automation system as claimed in claim 21, wherein the first communication link and the second communication link are formed as separate streams or as one single stream.

23. The redundant automation system as claimed in claim 13, wherein the first communication link and the second communication link are formed as separate streams or as one single stream.

* * * * *